United States Patent
Schoenhaber et al.

(10) Patent No.: US 11,179,676 B2
(45) Date of Patent: Nov. 23, 2021

(54) CATALYTICALLY ACTIVE PARTICULATE FILTER

(71) Applicant: UMICORE AG & CO. KG, Hanau-Wolfgang (DE)

(72) Inventors: Jan Schoenhaber, Darmstadt (DE); Naina Deibel, Pfungstadt (DE); Martin Roesch, Rodgau (DE); Stephanie Spiess, Darmstadt (DE); Meike Gotthardt, Frankfurt (DE); Nicole Schichtel, Butzbach Hoch-Weisel (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 16/954,305

(22) PCT Filed: Dec. 14, 2018

(86) PCT No.: PCT/EP2018/084902
§ 371 (c)(1),
(2) Date: Jun. 16, 2020

(87) PCT Pub. No.: WO2019/121375
PCT Pub. Date: Jun. 27, 2019

(65) Prior Publication Data
US 2021/0086135 A1    Mar. 25, 2021

(30) Foreign Application Priority Data

Dec. 19, 2017 (EP) .................................... 17208615

(51) Int. Cl.
| | | |
|---|---|---|
| *B01D 53/94* | (2006.01) | |
| *B01J 23/63* | (2006.01) | |
| *B01J 35/00* | (2006.01) | |
| *B01J 35/04* | (2006.01) | |
| *F01N 3/10* | (2006.01) | |
| *F01N 3/28* | (2006.01) | |
| *B01J 23/10* | (2006.01) | |
| *B01J 23/46* | (2006.01) | |

(Continued)

(52) U.S. Cl.
CPC ....... *B01D 53/945* (2013.01); *B01D 53/9468* (2013.01); *B01J 21/066* (2013.01); *B01J 23/10* (2013.01); *B01J 23/464* (2013.01); *B01J 23/63* (2013.01); *B01J 35/0006* (2013.01); *B01J 35/04* (2013.01); *F01N 3/035* (2013.01); *F01N 3/101* (2013.01); *F01N 3/28* (2013.01); *F01N 3/2825* (2013.01); *B01D 2255/1021* (2013.01); *B01D 2255/1023* (2013.01); *B01D 2255/1025* (2013.01); *B01D 2255/2061* (2013.01); *B01D 2255/2063* (2013.01); *B01D 2255/2065* (2013.01); *B01D 2255/2066* (2013.01); *B01D 2255/2092* (2013.01); *B01D 2255/20715* (2013.01); *B01D 2255/407* (2013.01); *B01D 2255/908* (2013.01); *B01D 2255/9022* (2013.01); *B01D 2255/9155* (2013.01); *B01D 2258/014* (2013.01); *F01N 2330/06* (2013.01); *F01N 2330/30* (2013.01); *F01N 2370/02* (2013.01); *F01N 2510/06* (2013.01); *F01N 2510/0684* (2013.01)

(58) Field of Classification Search
CPC ............ B01D 46/2418; B01D 53/9445; B01D 53/945; B01D 2255/102; B01D 2255/2061; B01D 2255/2065; B01D 2255/407; B01D 2255/908; B01D 2255/9155; B01D 2258/014; F01N 3/035; F01N 3/101; F01N 2250/02; B01J 23/10; B01J 23/40
See application file for complete search history.

(56) References Cited

U.S. PATENT DOCUMENTS

| | | | |
|---|---|---|---|
| 6,228,799 B1 * | 5/2001 | Aubert | .................... C07C 17/15 502/304 |
| 6,294,140 B1 | 9/2001 | Mussmann et al. | |
| 6,348,430 B1 | 2/2002 | Lindner et al. | |

(Continued)

FOREIGN PATENT DOCUMENTS

| | | |
|---|---|---|
| CN | 100427205 C | 10/2008 |
| CN | 104785257 A | 7/2015 |

(Continued)

OTHER PUBLICATIONS

International Search Report for PCT/EP2018/084902, dated Mar. 15, 2019 (5 pgs. with English translation).

(Continued)

*Primary Examiner* — Timothy C Vanoy
(74) *Attorney, Agent, or Firm* — Smith, Gambrell & Russell, LLP

(57) ABSTRACT

The invention relates to a particulate filter for removing particles, carbon monoxide, hydrocarbons and nitrogen oxides out of the exhaust gas of combustion engines operated with stoichiometric air/fuel mixture, comprising a wall flow filter with length L and a coating Z, wherein the wall flow filter includes channels E and A which extend in parallel between a first and a second end of the wall flow filter and are separated by porous walls, which form surfaces OE or OA, and wherein the channels E are closed at the second end and the channels A are closed at the first end, characterised in that coating Z is located in the porous walls and extends from the first end of the wall flow filter over the entire length L, and includes active aluminum oxide, two different cerium/zirconium/rare earth metal mixed oxides and at least one platinum group metal.

20 Claims, 1 Drawing Sheet

(51) Int. Cl.
   *B01J 21/06*   (2006.01)
   *F01N 3/035*   (2006.01)

(56) References Cited

U.S. PATENT DOCUMENTS

| | | | |
|---|---|---|---|
| 7,964,527 B2* | 6/2011 | Larcher | B01J 23/10 |
| | | | 502/302 |
| 8,007,750 B2 | 8/2011 | Chen et al. | |
| 8,066,963 B2 | 11/2011 | Klingmann et al. | |
| 8,397,488 B2 | 3/2013 | Woerz et al. | |
| 8,640,440 B2 | 2/2014 | Klingmann et al. | |
| 8,663,588 B2* | 3/2014 | Lindner | B01J 37/0244 |
| | | | 423/213.5 |
| 8,956,994 B2* | 2/2015 | Ifrah | B01J 35/1047 |
| | | | 502/304 |
| 9,156,023 B2* | 10/2015 | Klingmann | B01J 35/04 |
| 9,174,198 B2 | 11/2015 | Kawabata et al. | |
| 9,238,982 B2 | 1/2016 | Springer et al. | |
| 9,266,092 B2 | 2/2016 | Arnold et al. | |
| 9,517,462 B2 | 12/2016 | Roesch et al. | |
| 10,413,886 B2 | 9/2019 | Despres et al. | |
| 2004/0065078 A1 | 4/2004 | Schafer-Sindlinger et al. | |
| 2007/0093381 A1 | 4/2007 | Miyoshi et al. | |
| 2008/0090723 A1* | 4/2008 | Okamoto | C01G 25/006 |
| | | | 502/304 |
| 2010/0055012 A1 | 3/2010 | Grisstede et al. | |
| 2010/0275579 A1 | 11/2010 | Klingmann et al. | |
| 2010/0319332 A1 | 12/2010 | Jeske et al. | |
| 2011/0094207 A1 | 4/2011 | Woerz et al. | |
| 2013/0143732 A1 | 6/2013 | Aoki | |
| 2014/0140899 A1 | 5/2014 | Gabrielsson et al. | |
| 2017/0304773 A1 | 10/2017 | Onoe et al. | |
| 2017/0368536 A1 | 12/2017 | Depres et al. | |
| 2018/0178198 A1 | 6/2018 | Deeba et al. | |
| 2020/0094189 A1 | 3/2020 | Deibel et al. | |
| 2020/0188887 A1 | 6/2020 | Kobayashi et al. | |
| 2020/0306693 A1 | 10/2020 | Schoenhaber et al. | |
| 2020/0316565 A1* | 10/2020 | Fisher | C01G 25/006 |
| 2021/0069678 A1 | 3/2021 | Schoenhaber et al. | |
| 2021/0079822 A1 | 3/2021 | Schoenhaber et al. | |

FOREIGN PATENT DOCUMENTS

| | | |
|---|---|---|
| DE | 10 2011 050 788 A1 | 12/2012 |
| DE | 11 2013 002 163 T5 | 1/2015 |
| EP | 0 855 650 A2 | 12/1998 |
| EP | 0 885 650 A2 | 12/1998 |
| EP | 1 046 423 A2 | 10/2000 |
| EP | 1 657 410 A2 | 5/2006 |
| EP | 1 726 359 A1 | 11/2006 |
| EP | 1 974 809 A1 | 10/2008 |
| EP | 1 974 810 A1 | 10/2008 |
| EP | 2 042 225 A1 | 4/2009 |
| EP | 2 042 226 A2 | 4/2009 |
| EP | 2 322 773 A1 | 5/2011 |
| EP | 2 650 042 A1 | 10/2013 |
| EP | 1 541 220 B1 | 2/2014 |
| EP | 2 948 653 | 12/2015 |
| EP | 3 045 226 A1 | 7/2016 |
| EP | 3 162 428 A1 | 5/2017 |
| EP | 3 205 388 A1 | 8/2017 |
| EP | 3 207 977 A1 | 8/2017 |
| EP | 3 207 978 A1 | 8/2017 |
| EP | 3 207 987 A1 | 8/2017 |
| EP | 3 207 989 A1 | 8/2017 |
| EP | 3 207 990 A1 | 8/2017 |
| EP | 3 247 493 A1 | 11/2017 |
| EP | 3 406 322 A1 | 11/2018 |
| FR | 3 020 091 A1 | 10/2015 |
| JP | 2016-203116 A | 12/2016 |
| WO | 95/35152 | 12/1995 |
| WO | 2008/000449 A2 | 1/2008 |
| WO | 2014/178633 A1 | 11/2014 |
| WO | 2017/109514 A1 | 6/2017 |
| WO | 2017/209083 A1 | 12/2017 |

OTHER PUBLICATIONS

Written Opinion of the International Searching Authority for PCT/EP2018/084902, dated Mar. 15, 2019 (7 pgs.).
DIN 66132: Bestimmung der spezifischen Oberflache von Feststoffen durch Stickstoffadsorption; Einpunkt-Differenzverfahren nach Haul und Dümbgen. [Determination of specific surface area of solids by adsorption of nitrogen; single-point differential method according to Haul and Dümbgen.] Standard by Deutsches Institut Fur Normung E.V. [German National Standard], 1975. 5 pages in German (with English machine translation).
International Preliminary Report on Patentability dated Jun. 23, 2020 for International Patent Application No. PCT/EP2018/084902 (8 pages in German with English translation).
European Search Report dated Jun. 4, 2018 for European Application No. 17208615.9 (8 pages).
Von Johann Siebler, et al. MTZ Motortechnische Zeitschrift [Katalysatorprüfung] 1994, 55, pp. 214-218.
Non Final Office Action dated May 28, 2021 in U.S. Appl. No. 16/954,323 (24 pages).
Non Final Office Action dated Jun. 21, 2021 in U.S. Appl. No. 16/954,628 (7 pages).
Wikipedia https://de.wikipedia.org/wiki/Partikelgr%C3%B6%C3%9Fenverteilung "Partikelgrößenverteilung (Particle Size Distribution)" (14 pgs. with English Translation), Jun. 2020.

* cited by examiner

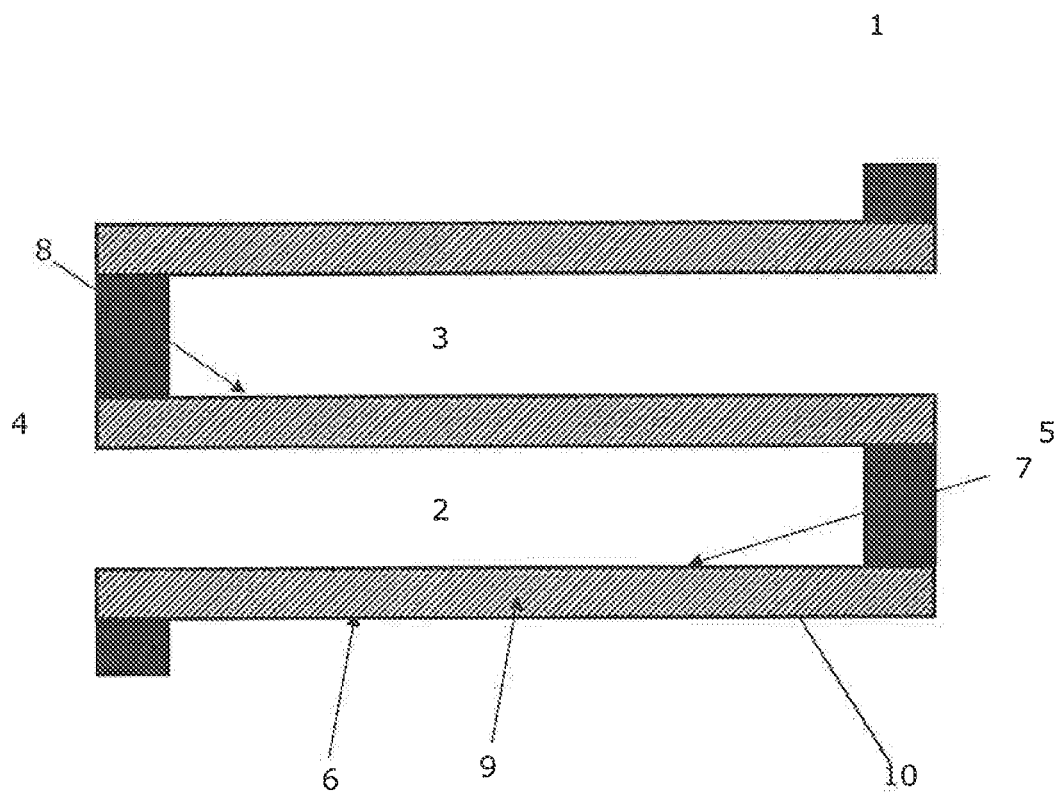

CATALYTICALLY ACTIVE PARTICULATE FILTER

The present invention relates to a catalytically active particulate filter that is particularly suitable for removing particles, carbon monoxide, hydrocarbons and nitrogen oxides out of the exhaust gas of combustion engines operated with stoichiometric air-fuel mixture.

Exhaust gases from combustion engines, i.e. gasoline or natural gas fueled engines, operated with stoichiometric air-fuel mixtures are cleaned in conventional methods with the aid of three-way catalytic converters. Such catalytic converters are capable of simultaneously converting the three major gaseous pollutants of the engine, namely hydrocarbons, carbon monoxide and nitrogen oxides, into harmless components. Stoichiometrically means that on average exactly as much air is available for combustion of the fuel present in the cylinder as is required for complete combustion. The combustion air ratio λ (A/F ratio; air/fuel ratio) sets the air mass $m_{L,actual}$ which is actually available for combustion in relation to the stoichiometric air mass $m_{L,st}$:

$$\lambda = \frac{m_{L,actual}}{m_{L,st}}$$

if λ<1 (e.g. 0.9) this means "air deficiency" and one speaks of a rich exhaust gas mixture; λ>1 (for example 1.1) means "excess air" and the exhaust gas mixture is referred to as lean. The statement λ=1.1 means that 10% more air is present than would be required for the stoichiometric reaction.

In addition to such gaseous pollutants, the exhaust gas from combustion engines also contains extremely fine particles (PM) resulting from the incomplete combustion of the fuel which essentially consist of soot. In contrast to the particle emission of diesel engines, the particles in the exhaust gas of stoichiometrically operated combustion engines, such as gasoline engines, are very small and have an average particle size of less than 1 μm. Typical particle sizes range from 10 to 200 nm. Furthermore, the amount of particles emitted is very low and ranges from 2 to 4 mg/km.

The European exhaust emission standard EU-6c is associated with a conversion of the limit value for such particles from the particle mass limit value to a more critical particle number limit value of $6 \times 10^{11}$/km (in the Worldwide Harmonized Light Vehicles Test Cycle—WLTP). This creates a need for exhaust gas cleaning concepts for stoichiometrically operated combustion engines, which include effectively operating equipment for removing particles.

Wall flow filters made of ceramic materials, such as silicon carbide, aluminum titanate and cordierite, have proven themselves in the field of cleaning exhaust gases from lean-burn engines, i.e. In particular diesel engines. These are made up of a multiple number of parallel channels formed by porous wans. The channels are alternately sealed at one of the two ends of the filter so that channels A, which are open at the first side of the filter and sealed at the second side of the filter, and channels B, which are sealed at the first side of the filter and open at the second side of the filter, are formed. For example, exhaust gas flowing into channels A can only leave the filter via channels B, and must flow through the porous walls between channels A and B for this purpose. When the exhaust gas passes through the wall, the particles are retained and the exhaust gas is cleaned.

The particles retained in this manner must then be burnt off or oxidized in order to prevent a clogging of the filter or an unacceptable increase in the back pressure of the exhaust system. For this purpose, the wall flow filter is, for example, provided with catalytically active coatings that reduce the ignition temperature of soot.

Applying such coatings to the porous walls between the channels (so-caned "on-wall coating") or introducing them into the porous walls (so-called "in-wan coating") is already known. EP 1 6571410 A2 also already describes a combination of both coating types; that is, part of the catalytically active material is present in the porous wags and another part is present on the porous walls.

The concept of removing particles out of the exhaust gas using wall flow filters has already been applied to the cleaning of exhaust gas out of combustion engines operated with stoichiometric air-fuel mixtures; see, for example, EP 2042226 A2. According to its teaching, a wall flow filter comprises two layers arranged one above the other, wherein one can be arranged in the porous wall and the other can be arranged on the porous wall.

DE 102011050788 A1 pursues a similar concept. There, the porous filter walls contain a catalyst material of a three-way catalyst, while in addition a catalyst material of a three-way catalytic converter is applied to partial regions of the filter walls.

FR 3020091 A1 discloses a particulate filter that comprises a coating in the porous walls along with coatings on the surfaces of the inlet and outlet channels. The latter extend over a partial area of the filter length, both on the inlet and outlet surfaces on the side of the filter at which the exhaust gas enters.

Further documents describing filter substrates provided with catalytically active coatings are EP 3205388 A1, EP 3207977 A1, EP 3207978 A1, EP 3207987 A1, EP 3207989 A1, EP 3207990 A1 and EP 3162428 A1.

There is still a need for catalytically active particulate filters that combine the functionalities of a particulate filter and a three-way catalytic converter and at the same time adhere to the limits that will apply in the future. The particulate filter should have as high a degree of conversion as possible for the gaseous pollutants and particles, especially also after aging, which corresponds to stress according to the legal continuous running requirements. At the same time, the filter should have as low a dynamic pressure as possible, so that the engine power is maintained and the lowest possible fuel consumption can be realized.

The present invention relates to a particulate filter for removing particles, carbon monoxide, hydrocarbons and nitrogen oxides out of the exhaust gas of combustion engines operated with stoichiometric air/fuel mixture, comprising a wall flow filter with length L and a coating Z, wherein the wall flow filter includes channels E and A which extend in parallel between a first and a second end of the wall flow filter and are separated by porous walls, which form surfaces $O_E$ or $O_A$, and wherein the channels E are closed at the second end and the channels A are closed at the first end, characterized in that coating Z is located in the porous walls and extends from the first end of the wall flow filter over the length L, and includes active aluminum oxide, at least, preferably two, different cerium/zirconium/rare earth metal mixed oxides and at least one platinum group metal.

Coating Z is catalytically active, in particular at operating temperatures of 250° C. to 1100° C. It usually contains one or more precious metals which are fixed on one or more carrier materials and two oxygen storage components which differ from one another. The oxygen storage components differ with respect to at least one of the components contained. Equal components of the oxygen storage materials may be present in equal or different amounts.

Cerium/zirconium/rare earth metal mixed oxides are particularly suitable as oxygen storage components. The term "cerium/zirconium/rare earth metal mixed oxide" within the meaning of the present invention excludes physical mixtures of cerium oxide, zirconium oxide and rare earth oxide. Rather, "cerium/zirconium/rare earth metal mixed oxides" are characterized by a largely homogeneous, three-dimensional crystal structure that is ideally free of phases of pure cerium oxide, zirconium oxide or rare earth oxide. Depending on the manufacturing process, however, not completely homogeneous products may arise which can generally be used without any disadvantage.

In all other respects, the term "rare earth metal" or "rare earth metal oxide" within the meaning of the present invention does not include cerium or cerium oxide.

Lanthanum oxide, yttrium oxide, praseodymium oxide, neodymium oxide and/or samarium oxide, for example, may be used as rare earth metal oxides in the cerium/zirconium/rare earth metal mixed oxides.

Lanthanum oxide, yttrium oxide and/or praseodymium oxide are preferred.

BRIEF DESCRIPTION OF THE DRAWING

FIG. 1 shows a schematic view of a particulate filter according to the invention.

Surprisingly, it has been found that a combination of different cerium/zirconium/rare earth metal mixed oxides can bring about a greatly improved conversion of gaseous pollutants after hard aging. Lanthanum oxide and/or yttrium oxide are particularly preferred as rare earth metals in this context, and lanthanum oxide and yttrium oxide, yttrium oxide and praseodymium oxide, and lanthanum oxide and praseodymium oxide are more particularly preferred.

In embodiments of the present invention, the oxygen storage components are free from neodymium oxide.

In embodiments of the present invention, in coating Z, the weight ratio of aluminum oxide to the sum of the two cerium/zirconium/rare earth metal mixed oxides is in the range from 10:90 to 60:40, preferably in the range from 20:80 to 50:50 and particularly preferably in the range from 25:75 to 35:65. In preferred embodiments, coating Z comprises in each case lanthanum-stabilized aluminum oxide in amounts of 10 to 60% by weight, preferably 20 to 50% by weight, particularly preferably 25 to 35% by weight, and oxygen storage components in amounts of 40 to 90% by weight, preferably 50 to 80% by weight, particularly preferably 85 to 75% by weight, in each case based on the sum of the weights of aluminum oxide and oxygen storage components in coating Z.

In embodiments, coating Z preferably comprises two oxygen storage components different from one another, wherein the weight ratio of the first cerium/zirconium/rare earth metal mixed oxide to the second cerium/zirconium/rare earth metal mixed oxide is in the range from 4:1 to 1:4, preferably in the range from 3:1 to 1:3 and particularly preferably in the range from 2:1 to 1:2.

In embodiments of the present invention, coating Z comprises a first and a second oxygen storage component, wherein the first oxygen storage component has a higher zirconium oxide content than the second oxygen storage component.

In accordance with the invention, the cerium oxide to zirconium oxide ratio in the cerium/zirconium/rare earth metal mixed oxides can vary within wide limits. It amounts to, for example, 0.1 to 1.5, preferably 0.2 to 1.25, more preferably 0.3 to 1. It is furthermore preferred for the first oxygen storage component to have a cerium oxide to zirconium oxide weight ratio of 0.7 to 0.1, which is smaller than in the second cerium/zirconium/rare earth metal mixed oxide, which has a cerium oxide to zirconium oxide weight ratio of 0.5 to 1.5. Other more preferred embodiments include a first oxygen storage component having a cerium oxide to zirconium oxide weight ratio of 0.6 to 0.2 and a second oxygen storage component having a cerium oxide to zirconium oxide weight ratio of 0.6 to 1.2. Still other most preferred embodiments include a first oxygen storage component having a cerium oxide to zirconium oxide weight ratio of 0.5 to 0.3, and the second oxygen storage component has a cerium oxide to zirconium oxide weight ratio of 0.7 to 1.0.

In a preferred embodiment, the particulate filter according to the invention is designed such that the first cerium/zirconium/rare earth metal mixed oxide has a cerium oxide content of 10% to 40% based on the weight of the first cerium/zirconium/rare earth metal mixed oxide, more preferably of 15% to 35% and very particularly preferably of 20% to 30% based on the weight of the first cerium/zirconium/rare earth metal mixed oxide.

In contrast, the zirconium oxide content in the first cerium/zirconium/rare earth metal mixed oxide is 40% to 90% based on the weight of the first cerium/zirconium/rare earth metal mixed oxide. It is advantageous if the zirconium oxide content in the first cerium/zirconium/rare earth metal mixed oxide is between 50% and 75%, very preferably 55% to 65%, based on the weight of the first cerium/zirconium/rare earth metal mixed oxide.

Likewise, a cerium oxide content of 25% to 60% based on the weight of the second cerium/zirconium/rare earth metal mixed oxide should prevail in the second cerium/zirconium/rare earth metal mixed oxide. It is more advantageous if in the second cerium/zirconium/rare earth metal mixed oxide there is a cerium oxide content of 30% to 55%, very preferably 35% to 50%, based on the weight of the second cerium/zirconium/rare earth metal mixed oxide.

In a further preferred embodiment, the second cerium/zirconium/rare earth metal mixed oxide has a zirconium oxide content of 20% to 70% based on the weight of the second cerium/zirconium/rare earth metal mixed oxide. It is more preferred here if the second cerium/zirconium/rare earth metal mixed oxide has a zirconium oxide content of 30% to 60% very particularly preferably of 40% to 55% based on the weight of the second cerium/zirconium/rare earth metal mixed oxide.

It is preferred according to the invention if both cerium/zirconium/rare earth metal mixed oxides are doped with lanthanum oxide, so that the content of lanthanum oxide is preferably >0% to 10% based on the weight of the cerium/zirconium/rare earth metal mixed oxide. Particularly advantageously, these lanthanum oxide-containing oxygen storage components have a lanthanum oxide to cerium oxide mass ratio of 0.05 to 0.5.

In embodiments of the present invention, coating Z comprises lanthanum-stabilized aluminum oxide as well as rhodium, palladium or palladium and rhodium and two different oxygen storage components comprising zirconium oxide, cerium oxide, lanthanum oxide and yttrium oxide or praseodymium oxide.

The first cerium/zirconium/rare earth metal mixed oxide is preferably doped with yttrium oxide in addition to lanthanum oxide. A preferred particulate filter has an yttrium oxide content in the first cerium/zirconium/rare earth metal mixed oxide of 2% to 25% based on the weight of the first cerium/zirconium/rare earth metal mixed oxide. More preferably, the yttrium content of the first cerium/zirconium/rare earth metal mixed oxide is between 4% and 20%, very preferably 10% to 15%, based on the weight of the first cerium/zirconium/rare earth metal mixed oxide.

An embodiment in which the second cerium/zirconium/rare earth metal mixed oxide is doped not only with lanthanum oxide but also with a further metal oxide from the group of rare earth metal oxides, preferably with praseodymium, is also advantageous.

In embodiments of the present invention, the zirconium oxide content of the yttrium oxide-containing oxygen storage component is greater in coating Z than the zirconium oxide content of the praseodymium oxide-containing oxygen storage component, in each case based on the respective oxygen storage component.

The content of the second rare earth metal of the second cerium/zirconium/rare earth metal mixed oxide may be between 2% and 15% based on the weight of the second cerium/zirconium/rare earth metal mixed oxide. It is more advantageous if the content of the second rare earth metal of the second cerium/zirconium/rare earth metal mixed oxide is 3% to 10%, very preferably 4% to 8%, based on the weight of the second cerium/zirconium/rare earth metal mixed oxide.

In coating Z, the yttrium oxide content of the first oxygen storage component is in particular 5 to 15% by weight based on the weight of the oxygen storage component. The lanthanum oxide to yttrium oxide weight ratio is in particular 0.1 to 1, preferably 0.15 to 0.8 and very preferably 0.2 to 0.5.

In coating Z, the praseodymium content of the second oxygen storage component is in particular 2 to 10% by weight based on the weight of the oxygen storage component. The lanthanum oxide to praseodymium oxide weight ratio is in particular 0.1 to 2.0, preferably 0.2 to 1.8 and very preferably 0.5 to 1.5.

In one embodiment, coating Z contains precious metals as catalytically active elements.

Platinum, palladium and rhodium or mixtures thereof are particularly suitable for this purpose, palladium, rhodium, palladium and rhodium, or platinum, palladium and rhodium being preferred, and palladium and rhodium being particularly preferred. Furthermore, both cerium/zirconium/rare earth metal mixed oxides may be activated with palladium and rhodium, platinum and rhodium or platinum, palladium and rhodium.

It is preferred for the catalytically active coating to be located in the pores of the porous wall of a wall flow filter. Only small parts can be present on the wall due to the coating process. According to the invention, coating Z is present in the pores of the wall by >95%.

The precious metals are usually used in quantities of 0.15 to 5 g/l based on the volume of the wall flow filter. In a preferred embodiment, the precious metals are present both on the aluminum oxide and on the oxygen storage components.

All materials familiar to the person skilled in the art for this purpose may be used as substrate materials for the precious metals. Such materials are in particular metal oxides with a BET surface area of 30 to 250 m$^2$/g, preferably 100 to 200 m$^2$/g (determined according to DIN 66132—newest version on the date of application).

Particularly suitable carrier materials for the precious metals are selected from the series consisting of aluminum oxide, doped aluminum oxide, silicon oxide, titanium dioxide and mixed oxides of one or more of these. Doped aluminum oxides are, for example, aluminum oxides doped with lanthanum oxide, barium oxide, zirconium oxide and/or titanium oxide. Lanthanum-stabilized aluminum oxide is advantageously used, wherein lanthanum is used in quantities of 1 to 10% by weight, preferably 3 to 6% by weight, in each case calculated as $La_2O_3$ and based on the weight of the stabilized aluminum oxide.

Coating Z usually contains oxygen storage components in amounts of 15 to 120 g/l based on the volume of the wall flow filter.

The mass ratio of carrier materials and oxygen storage components in coating Z is usually 0.2 to 1.5, for example 0.3 to 0.8.

In embodiments of the present invention, coating Z contains one or more alkaline earth compounds such as strontium oxide, barium oxide or barium sulfate. The amount of barium sulfate per coating is, in particular, 2 to 20 g/l volume of the wall flow filter.

Coating Z contains, in particular, strontium oxide or barium oxide.

In further embodiments of the present invention, coating Z contains additives such as rare earth compounds, for example lanthanum oxide and/or binders such as aluminum compounds. Such additives are used in quantities that can vary within wide limits and that the person skilled in the art can determine by simple means in the specific case.

According to the present invention, coating Z extends from the first end of the wan flow filter over the entire length L of the wall flow filter. The loading of the wall flow filter with coating Z preferably amounts to 20 to 125 g/l based on the volume of the wall flow filter.

In embodiments of the present invention, coating Z does not contain a zeolite or a molecular sieve.

Wall flow filters that can be used in accordance with the present invention are well-known and commercially available. They consist, for example, of silicon carbide, aluminum titanate or cordierite, for example having a cell density of 200 to 400 cells per square inch (cps), i.e. approximately 30 to 60 cells per cm$^2$, and usually a wall thickness of between 6 and 12 mil, or 0.1524 and 0.305 mm.

In the uncoated state, they have porosities of 50 to 80%, in particular 55 to 75%, for example. In the uncoated state, their average pore size is, for example, 10 to 25 micrometers. Generally, the pores of the wall flow filter are so-called open pores, i.e. they have a connection to the channels. Furthermore, the pores are normally interconnected with one another. This enables, on the one hand, easy coating of the inner pore surfaces and, on the other hand, easy passage of the exhaust gas through the porous walls of the wan flow filter.

The particulate filter according to the invention can be produced by methods known to the person skilled in the art, for example by applying a coating suspension, which is usually referred to as washcoat, to the wall flow filter by means of one of the usual dip coating methods or pump and suction coating methods. This is usually followed by thermal post-treatment or calcination.

The person skilled in the art knows that the average pore size of the wall flow filter and the average particle size of the catalytically active materials must be matched to each other in order to achieve an on-wall coating or in-wall coating. In the case of an in-wall coating, the average particle size of the catalytically active materials must be small enough to penetrate the pores of the wall flow filter. In the case of an on-wall coating on the other hand, the average particle size of the catalytically active materials must be large enough not to penetrate the pores of the wall flow filter.

In embodiments of the present invention, the coating suspension for the production of coating Z is ground up to a particle size distribution of $d_{50}=1$ to 2 μm and $d_{99}=6$ to 7 μm.

The particulate filter according to the invention is perfectly suitable for removing particles, carbon monoxide, hydrocarbons and nitrogen oxides out of the exhaust gas of combustion engines operated with stoichiometric air/fuel mixture.

The present invention thus also relates to a method for removing particles, carbon monoxide, hydrocarbons and nitrogen oxides out of the exhaust gas of combustion engines operated with stoichiometric air/fuel mixture, characterized in that the exhaust gas is passed over a particulate filter according to the invention.

The exhaust gas can be passed over a particulate filter according to the invention in such a way that it enters the particulate filter through channels E and leaves it again through channels A.

However, it is also possible for the exhaust gas to enter the particulate filter through channels A and to leave it again through channels E.

FIG. 1 shows a particulate filter according to the invention which comprises a wall flow filter of length L (1) with channels E (2) and channels A (3) extending in parallel between a first end (4) and a second end (5) of the wall flow filter and separated by porous walls (6), which form surfaces $O_E$ (7) or $O_A$ (8), and wherein the channels E (2) are closed at the second end (5) and the channels A (3) are closed at the first end (4). Coating Z (9) is located in the porous walls (6).

The invention is explained in more detail in the following examples.

EXAMPLES

Four filters each were provided with different catalytically active coatings. Ceramic wall flow filters of highly porous cordierite having a diameter of 11.84 cm and a length of 15.24 cm and a cell density of 300 cpsi (46.5 cells per cm$^2$) and a wall thickness of 8.5 mil, i.e. 0.02 mm, were used as filter substrates. Each filter was provided with a coating of 76.27 g/l based on the filter volume.

Comparative Example 1

Aluminum oxide stabilized with lanthanum oxide was suspended in water together with an oxygen storage component containing 40% by weight cerium oxide, 50% by weight zirconium oxide, 5% by weight lanthanum oxide and 5% by weight praseodymium oxide. The weight ratio of aluminum oxide to oxygen storage component was 30:70. The suspension thus obtained was then mixed with a palladium nitrate solution and a rhodium nitrate solution under constant stirring. The resulting coating suspension was used directly for coating a commercially available wall flow filter substrate, the coating being introduced into the porous filter wall over 100% of the substrate length. The total load of this filter amounted to 76.27 g/l; the precious metal load amounted to 1.271 g/l having a paladium to rhodium ratio of 5:1. The coated filter thus obtained was dried and then calcined.

Comparative Example 2

Aluminum oxide stabilized with lanthanum oxide was suspended in water together with an oxygen storage component containing 24% by weight cerium oxide, 60% by weight zirconium oxide, 3.5% by weight lanthanum oxide and 12.5% by weight yttrium oxide. The weight ratio of aluminum oxide to oxygen storage component was 30:70. The suspension thus obtained was then mixed with a palladium nitrate solution and a rhodium nitrate solution under constant stirring. The resulting coating suspension was used directly for coating a commercially available wall flow filter substrate, the coating being introduced into the porous filter wall over 100% of the substrate length. The total load of this filter amounted to 76.27 g/l; the precious metal load amounted to 1.271 g/l having a paladium to rhodium ratio of 5:1. The coated filter thus obtained was dried and then calcined.

Example 1 According to the Invention

Aluminum oxide stabilized with lanthanum oxide was suspended in water together with a first oxygen storage component comprising 40% by weight cerium oxide, 50% by weight zirconium oxide, 5% by weight lanthanum oxide and 5% by weight praseodymium oxide, and a second oxygen storage component comprising 24% cerium oxide, 60% by weight zirconium oxide, 3.5% by weight lanthanum oxide and 12.5% by weight yttrium oxide. Both oxygen storage components were used in equal parts. The weight ratio of aluminum oxide to oxygen storage components was 30:70. The suspension thus obtained was then mixed with a palladium nitrate solution and a rhodium nitrate solution under constant stirring. The resulting coating suspension was used directly for coating a commercially available wall flow filter substrate, the coating being introduced into the porous filter wall over 100% of the substrate length. The total load of this filter amounted to 76.27 g/l; the precious metal load amounted to 1.271 g/l having a palladium to rhodium ratio of 5:1. The coated filter thus obtained was dried and then calcined.

|  | 600 m$^3$/h | 900 m$^3$/h |
| --- | --- | --- |
| Comparative Example 1 | 52.9 mbar ± 0.2 mbar | 107.4 mbar ± 0.3 mbar |
| Comparative Example 2 | 53.3 mbar equals ± 0.4 mbar | 107.2 mbar ± 0.5 mbar |
| Example 1 | 53.0 mbar ± 0.6 mbar | 105.9 mbar ± 0.6 mbar |

In order to determine the catalytic properties of the filter according to the invention, a filter of each of Comparative Example 1, Comparative Example 2 and Example 1 was aged in engine test bench aging. The aging process consists of overrun fuel cut-off aging with an exhaust gas temperature of 950° C. in front of the catalyst inlet (1030° C. maximum bed temperature). The aging time was 19 hours.

Subsequently, an engine test bench was used to test the light-off performance at a constant average air ratio λ, and the dynamic conversion with a change of λ.

Table 1 contains the temperatures $T_{50}$ at which 50% each of the considered components are converted. Here, the light-off performance with stoichiometric exhaust gas composition (λ=0.999 with ±3.4% amplitude) was determined.

TABLE 1

Results of the light-off performance after aging for Example 1 and
Comparative Examples 1 and 2

|  | $T_{50}$ HC stoichiometric | $T_{50}$ CO stoichiometric | $T_{50}$ NOx stoichiometric |
|---|---|---|---|
| Comparative Example 1 | 391 | 399 | 406 |
| Comparative Example 2 | 370 | 377 | 377 |
| Example 1 | 374 | 379 | 379 |

The dynamic conversion performance was determined in a range for λ of 0.99 to 1.01 at a constant temperature of 510° C. The amplitude of λ in this case was ±6.8%. Table 2 contains the conversion at the point of intersection of the CO and NOx conversion curves, as well as the associated HC conversion.

TABLE 2

Results of the dynamic conversion performance after aging for
Example 1 and Comparative Examples 1 and 2

|  | CO/NOx conversion at the point of intersection | HC conversion at λ of the CO/NOx point of intersection |
|---|---|---|
| Comparative Example 1 | 82% | 96% |
| Comparative Example 2 | 81.5% | 97% |
| Example 1 | 90% | 97% |

Example 1 according to the invention shows a marked improvement in the dynamic CO/NOx conversion after aging, while the light-off performance is similarly good as in Comparative Example 2, but better than in Comparative Example 1.

OSC Properties:

The oxygen storage capacity was determined in two different experiments. Table 3 shows the values for the lambda step test which characterizes the static oxygen storage capacity. The air/fuel ratio λ before the filer is changed from rich (λ=0.96) to lean (λ=1.04). The stored oxygen quantity is calculated from the delay time of the post-cat lambda probe relative to the pre-cat lambda probe.

TABLE 3

Static oxygen storage capacity after aging for Example 1
and Comparative Examples 1 and 2

|  | Oxygen storage capacity (mg/l) |
|---|---|
| Comparative Example 1 | 182 |
| Comparative Example 2 | 132 |
| Example 1 | 194 |

In another test, dynamic oxygen storage capability is determined. At an average value of λ=1, the exhaust gas is subjected to various λ amplitudes with a frequency of 1 Hz. The amplitude signal of the post-cat lambda probe is divided by the amplitude signal of the pre-cat lambda probe. The smaller the value, the better the dynamic oxygen storage capacity. The results are shown in Table 4.

TABLE 4

Dynamic oxygen storage capacity after aging for Example 1
and Comparative Examples 1 and 2

|  | 2% amplitude | 3.4% amplitude | 6.8% amplitude |
|---|---|---|---|
| Comparative Example 1 | 0.24 | 0.37 | 0.41 |
| Comparative Example 2 | 0.08 | 0.13 | 0.28 |
| Example 1 | 0.09 | 0.14 | 0.23 |

The example according to the invention shows both a high static and a very good dynamic oxygen storage capacity after aging.

The invention claimed is:

1. Particulate filter for removing particles, carbon monoxide, hydrocarbons, and nitrogen oxides out of the exhaust gas of combustion engines operated with stoichiometric air/fuel mixture, comprising a wall flow filter with length L and a coating Z, wherein the wall flow filter includes channels E and A which extend in parallel between a first and a second end of the wall flow filter and are separated by porous walls, which form surfaces OE or OA, and wherein the channels E are closed at the second end and the channels A are closed at the first end,
characterized in that
coating Z is located in the porous walls and extends from the first end of the wall flow filter over the length L, and includes active aluminum oxide, at least two different cerium/zirconium/rare earth metal mixed oxides and at least one platinum group metal, and the first cerium/zirconium/rare earth metal mixed oxide is doped with yttrium oxide in addition to lanthanum oxide.

2. Particulate filter according to claim 1,
characterized in that the weight ratio of aluminum oxide to the sum of the two cerium/zirconium/rare earth metal mixed oxides is in the range from 10:90 to 60:40.

3. Particulate filter according to claim 1,
characterized in that
the weight ratio of the first cerium/zirconium/rare earth metal mixed oxide to the second cerium/zirconium/rare earth metal mixed oxide is in the range from 4:1 to 1:4.

4. Particulate filter according to claim 1,
characterized in that
the first cerium/zirconium/rare earth metal mixed oxide has a higher zirconium oxide content than the second cerium/zirconium/rare earth metal mixed oxide.

5. Particulate filter according to claim 1,
characterized in that
the first cerium/zirconium/rare earth metal mixed oxide has a cerium oxide to zirconium oxide weight ratio of 0.7 to 0.1, which is smaller than in the second cerium/zirconium/rare earth metal mixed oxide, which has a cerium oxide to zirconium oxide weight ratio of 0.5 to 1.5.

6. Particulate filter according to claim 1,
characterized in that
the first cerium/zirconium/rare earth metal mixed oxide has a cerium oxide content of 10% to 40% based on the weight of the first cerium/zirconium/rare earth metal mixed oxide.

7. Particulate filter according to claim 1,
characterized in that
the first cerium/zirconium/rare earth metal mixed oxide has a zirconium oxide content of 40% to 90% based on the weight of the first cerium/zirconium/rare earth metal mixed oxide.

8. Particulate filter according to claim 1, characterized in that the second cerium/zirconium/rare earth metal mixed oxide has a cerium oxide content of 25% to 60% based on the weight of the second cerium/zirconium/rare earth metal mixed oxide.

9. Particulate filter according to claim 1, characterized in that the second cerium/zirconium/rare earth metal mixed oxide has a zirconium oxide content of 20% to 70% based on the weight of the second cerium/zirconium/rare earth metal mixed oxide.

10. Particulate filter according to claim 1, characterized in that both cerium/zirconium/rare earth metal mixed oxides are doped with lanthanum oxide.

11. Particulate filter according to claim 1, characterized in that the lanthanum oxide content is >0% to 10% based on the weight of the particular cerium/zirconium/rare earth metal mixed oxide.

12. Particulate filter according to claim 1, characterized in that the yttrium oxide content of the first cerium/zirconium/rare earth metal mixed oxide is 2% to 25% based on the weight of the first cerium/zirconium/rare earth metal mixed oxide.

13. Particulate filter according to claim 1, characterized in that the second cerium/zirconium/rare earth metal mixed oxide is doped not only with lanthanum oxide but also with a further metal oxide from the group of rare earth metal oxides.

14. Particulate filter according to claim 1, characterized in that the content of the second rare earth metal of the second cerium/zirconium/rare earth metal mixed oxide is 2% to 15% based on the weight of the second cerium/zirconium/rare earth metal mixed oxide.

15. Particulate filter according to claim 1, characterized in that the at least one platinum group metal comprises at least one of platinum, palladium, or rhodium.

16. Particulate filter according to claim 1, characterized in that both cerium/zirconium/rare earth metal mixed oxides are activated with (i) palladium and rhodium, (ii) platinum and rhodium, or (iii) platinum, palladium and rhodium.

17. Particulate filter according to claim 1, wherein the second cerium/zirconium/rare earth metal mixed oxide is doped not only with lanthanum oxide but also with praseodymium.

18. Particulate filter according to claim 1, wherein coating Z does not contain a zeolite or a molecular sieve.

19. Particulate filter according to claim 1, wherein >95% of coating Z is present in the porous walls.

20. Method for removing particles, carbon monoxide, hydrocarbons and nitrogen oxides out of the exhaust gas of combustion engines operated with stoichiometric air/fuel mixture, characterized in that the exhaust gas is passed over a particulate filter according to claim 1.

* * * * *